US012385562B2

(12) United States Patent
Gönülalan et al.

(10) Patent No.: US 12,385,562 B2
(45) Date of Patent: Aug. 12, 2025

(54) MOTOR VEHICLE TRANSMISSION WITH A TORQUE CONVERTER

(71) Applicant: ZF Friedrichshafen AG, Friedrichshafen (DE)

(72) Inventors: Gürhan Gönülalan, Friedrichshafen (DE); Harald Stier, Bodnegg (DE); Stefan Benz-Breitweg, Wolfegg (DE); Gabriele Glade, Friedrichshafen (DE); Manuel Breymayer, Ehingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 151 days.

(21) Appl. No.: 18/313,676

(22) Filed: May 8, 2023

(65) Prior Publication Data

US 2024/0019026 A1 Jan. 18, 2024

(30) Foreign Application Priority Data

May 9, 2022 (DE) ..................... 10 2022 204 508.4

(51) Int. Cl.
*F16H 57/04* (2010.01)
*F16H 45/02* (2006.01)

(52) U.S. Cl.
CPC ......... *F16H 57/0452* (2013.01); *F16H 45/02* (2013.01); *F16H 57/0424* (2013.01); *F16H 2045/0215* (2013.01)

(58) Field of Classification Search
CPC .............................................. F16H 2045/0215
See application file for complete search history.

(56) References Cited

U.S. PATENT DOCUMENTS

| 9,878,706 B2 | 1/2018 | Frait et al. |
| 10,385,960 B2 | 8/2019 | Zhang et al. |
| 10,428,922 B2 | 10/2019 | Ramsey et al. |
| 11,548,367 B2 | 1/2023 | Gyarmati et al. |

(Continued)

FOREIGN PATENT DOCUMENTS

| DE | 102014118485 A1 | 6/2015 |
| DE | 102018119186 A1 | 2/2019 |

(Continued)

OTHER PUBLICATIONS

German Search Report DE 10 2022 204 508.4, dated Nov. 30, 2022. (12 pages).

*Primary Examiner* — Daniel D Yabut
(74) *Attorney, Agent, or Firm* — Dority & Manning, P.A.

(57) ABSTRACT

A motor vehicle transmission (1) includes a transmission housing (2) with torque converter (4) accommodated in the transmission housing (2) and a first oil guide device (9) positioned at an axial side of the torque converter (4). A housing wall (11) of the transmission housing (2) encloses the torque converter (4) radially outwardly at least in sections and has an inner surface (17) with an inner diameter configured such that a gap (13) defined by the inner surface (17) of the housing wall (11) and an outer surface (39) of the torque converter (4) is configured to convey oil from a first area (15) of the motor vehicle transmission (1) into a second area (16) of the motor vehicle transmission (1) during a rotary movement of the torque converter (4). The second area (16) is arranged above the first area (15) in an installed position of the motor vehicle transmission (1).

17 Claims, 10 Drawing Sheets

(56) References Cited

U.S. PATENT DOCUMENTS

| | | | |
|---|---|---|---|
| 2017/0051822 A1* | 2/2017 | Toaso, Jr. | ............ F16H 57/0471 |
| 2019/0154136 A1* | 5/2019 | Zwerger | .............. F16H 57/0423 |
| 2020/0072331 A1 | 3/2020 | Ubelhart et al. | |
| 2021/0053433 A1* | 2/2021 | Gyarmati | ............ F16H 57/0436 |

FOREIGN PATENT DOCUMENTS

| | | |
|---|---|---|
| DE | 102018129306 A1 | 6/2019 |
| DE | 102020203984 A1 | 11/2020 |
| DE | 102019212670 A1 | 2/2021 |

* cited by examiner

MOTOR VEHICLE TRANSMISSION WITH A TORQUE CONVERTER

CROSS-REFERENCE TO RELATED APPLICATION

The present application is related and has right of priority to German Patent Application No. DE102022204508.4 filed on May 9, 2022, which is incorporated by reference in its entirety for all purposes.

FIELD OF THE INVENTION

The invention relates generally to a motor vehicle transmission with a torque converter.

BACKGROUND

DE 10 2014 118 485 A1 discloses a motor vehicle transmission with a torque converter. The motor vehicle transmission includes a front module having an electric machine and a clutch, and a gearbox arranged behind the front module, wherein a torque converter is arranged between the gearbox and the front module. The arrangement made up of a front module, a gearbox, and a torque converter from DE 10 2014 118 485 A1 provides a modular hybrid motor-vehicle transmission. A guide device for oil is arranged between the torque converter and a housing of the transmission. This guide device for oil is trough-like or pot-like and has a base and two lateral walls, which are spaced apart from each other in an axial direction. The bottom of this oil guide device and the torque converter define a cavity or a gap through which oil can be conveyed during a rotary movement of the torque converter and, in fact, conveyed in the direction of a scraper window of the oil guide device. Due to the fact that the base of the oil guide device is arranged between a housing wall of the transmission housing and the torque converter as viewed in a radial direction, a greater amount of installation space is required as viewed in a radial direction.

SUMMARY OF THE INVENTION

On the basis thereof, example aspects of the invention provide a new type of motor vehicle transmission with a torque converter, which requires less installation space. According to example aspects of the invention, a housing wall of the transmission housing enclosing the torque converter radially outwardly at least partially or in sections has an inner surface with an inner diameter, which is designed such that a gap defined by the inner surface of this housing wall and an outer surface of the torque converter is configured to convey oil from a first area of the motor vehicle transmission into a second area of the motor vehicle transmission during a rotary movement of the torque converter, wherein the second area of the motor vehicle transmission is arranged above the first area in an installed position of the motor vehicle transmission in the motor vehicle.

In the motor vehicle transmission according to example aspects of the invention, the gap for conveying the oil during a rotary movement of the torque converter is directly defined by the inner surface of the housing wall of the transmission housing, which encloses the torque converter radially outwardly at least partially or in sections as viewed in a radial direction, and the outer surface of the torque converter. There is no base of an oil guide device arranged between the housing wall of the transmission housing and the torque converter. As a result, the radial installation space requirement of the motor vehicle transmission can be reduced.

Preferably, the first oil guide device is formed as an oil collecting plate, which has at least one first through-hole, via which the first oil guide device guides oil in the direction of the torque converter, and which has at least one second through-hole in the second area of the motor vehicle transmission, via which the first oil guide device guides oil away from the torque converter, the oil being conveyable during the rotary movement of the torque converter via the gap defined by the inner surface of the housing wall and the outer surface of the torque converter.

The first oil guide device is arranged exclusively at an axial side of the torque converter, wherein, as viewed in an axial direction, the first oil guide device formed as an oil collecting plate has the at least one first through-hole for guiding the oil in the direction of the torque converter and also the at least one second through-hole for guiding the oil in the opposite direction away from the torque converter.

Preferably, the motor vehicle transmission has a second oil guide device, which is arranged upstream from the housing wall delimiting the gap radially outwardly relative to an oil flow through the gap caused by a rotary movement of the torque converter, wherein the second oil guide device and the first oil guide device are separate assemblies, and wherein the second oil guide device forms a housing wall of the transmission housing and closes an opening in the transmission housing in the first area of the motor vehicle transmission. The second oil guide device extends the housing wall enclosing the torque converter radially outwardly at least partially or in sections upstream from the housing wall as viewed in the circumferential direction.

The second oil guide device closes an opening in the transmission and, in this way, forms a housing wall of the transmission. As a result, it is possible to further reduce the radial installation space requirement of the transmission.

The second oil guide device is preferably made of plastic and has a smaller thickness than the housing wall of the transmission, which adjoins the second oil guide device and is preferably made of a metal material. As a result, the through-hole can be covered by the second oil guide device without colliding with an outer contour of a pump and/or of a pump motor of the motor vehicle transmission, in order to prevent oil from flowing out of a transmission chamber accommodating the torque converter via this opening in the direction of the pump or the pump motor.

Preferably, the motor vehicle transmission has a third oil guide device, which is arranged downstream from the housing wall delimiting the gap radially outwardly relative to an oil flow through the gap caused by a rotary movement of the torque converter, wherein the third oil guide device is arranged in the second area of the motor vehicle transmission, and wherein, preferably, the gap enlarges upstream from the third oil guide device relative to an oil flow through the gap caused by a rotary movement of the torque converter. The third oil guide device, in interaction with the first oil guide device, enables an orderly discharge of the oil from the gap in the direction of an oil pan.

BRIEF DESCRIPTION OF THE DRAWINGS

Exemplary embodiments of the invention are explained in greater detail with reference to the drawings, without being limited thereto, wherein.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Example aspects of invention relate to a motor vehicle transmission of a motor vehicle, more particularly to a hybrid motor-vehicle transmission of a hybrid vehicle.

FIGS. 1 through 6 each show a different view of a motor vehicle transmission 1 according to example aspects of the invention. FIGS. 7 through 11 each show a different view of different oil guide devices of the motor vehicle transmission 1.

The motor vehicle transmission 1 according to example aspects of the invention has a transmission housing 2. The transmission housing 2 is preferably made of a metal material. The transmission housing 2 defines a hollow space, which is subdivided into multiple transmission chambers, wherein the transmission chambers are used for accommodating assemblies of the motor vehicle transmission 1. FIGS. 1 through 6 each show a different view from the front onto the transmission housing 2 and a first transmission chamber 3, which is defined by the transmission housing 2 and in which at least a torque converter 4 and, in the case of a hybrid transmission, also an electric machine having a separating clutch (not shown) are arranged.

Figure 1:
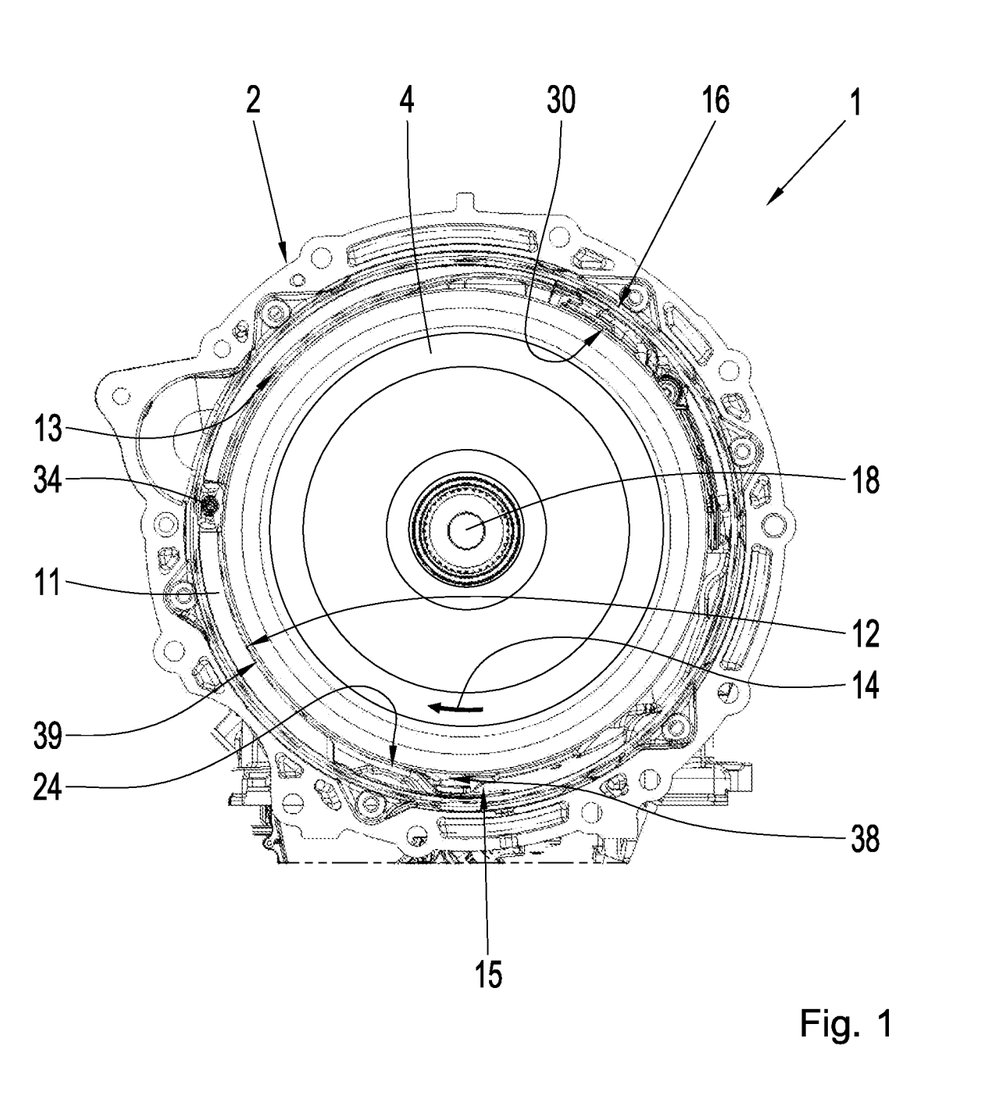
FIG. 1 shows a view from the front onto a motor vehicle transmission, namely onto a transmission housing and a torque converter accommodated in the transmission housing.
Figure 2:
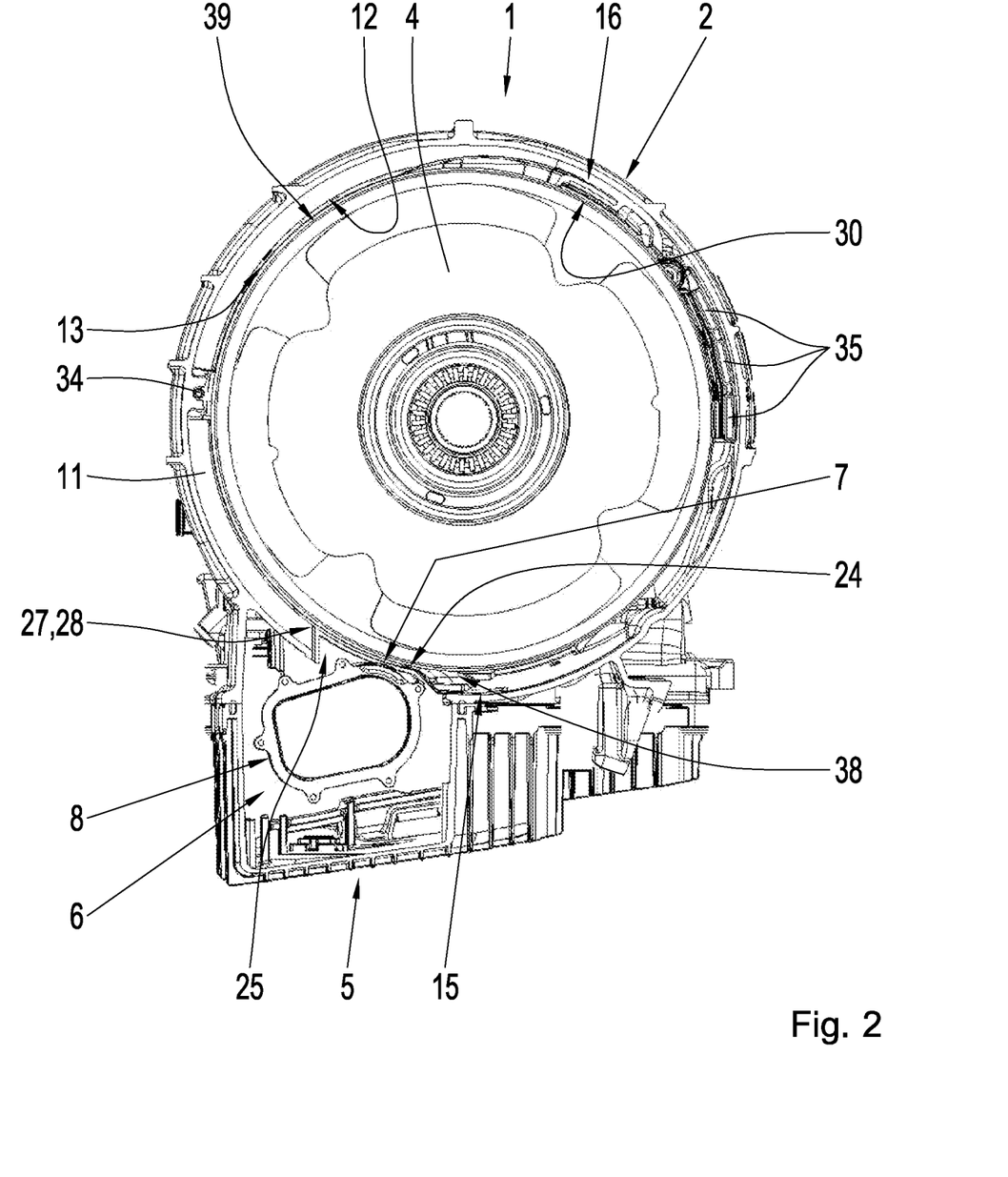
FIG. 2 shows a cross-section of FIG. 1 in a radial cutting plane through the torque converter.

As is shown in FIG. 2, an oil pan 5 adjoins the transmission housing 2 underneath the transmission housing 2, the oil pan 5 defining, together with the transmission housing 2, a second transmission chamber 6 in which, more particularly, an oil pump (not shown) is arranged with an oil pump motor 7 and electronic assemblies 8 for the open-loop and/or closed-loop control of the operation of the transmission, such as, for example, of the oil pump motor 7.

In FIGS. 1 through 6, a further transmission chamber is formed behind the first transmission chamber 3, which is used at least for accommodating the torque converter 4 and, in the case of a hybrid transmission, also for accommodating an electric machine and a separating clutch, the further transmission chamber accommodating the actual gearbox of the motor vehicle transmission 1, i.e., friction-locking shift elements and/or form-locking shift elements, which provide different gears and, therefore, ratios of the motor vehicle transmission 1 depending on shift position.

The first transmission chamber 3 of the transmission housing 2, which is used for accommodating the torque converter 4, and the third transmission chamber (not visible) of the transmission housing 2, which is formed behind the first transmission chamber 3 and is used for accommodating the actual gearbox, are typically separated from each other, more particularly by an oil supply system. Such an oil supply system is not visible in the figures.

Figure 7:
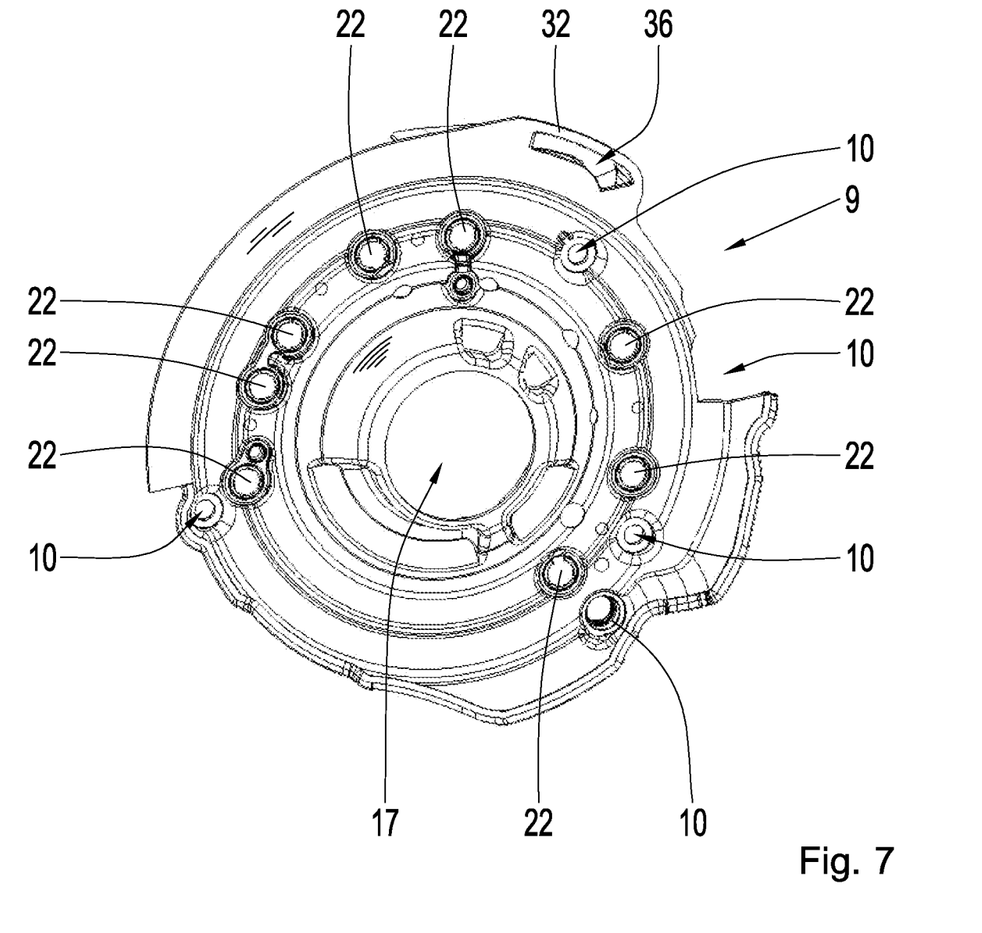
FIG. 7 shows a perspective view of a first oil guide device from the front.
Figure 8:
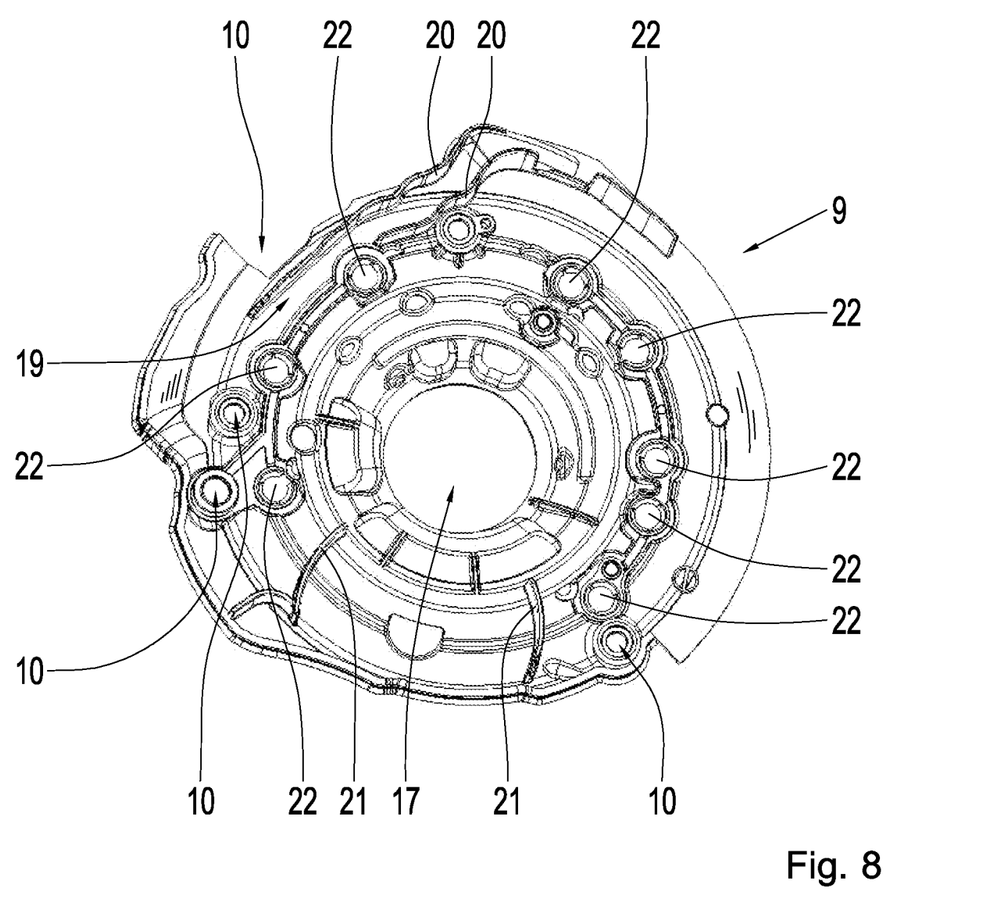
FIG. 8 shows a perspective view of the first oil guide device from the back.

Rather, a first oil guide device 9 is shown in FIGS. 3 through 6, which, in the viewing direction from the front onto the motor vehicle transmission 1, is positioned in front of the oil supply system and, therefore, conceals the oil supply system in the representations from FIGS. 3 through 6. FIGS. 7, 8 show the first oil guide device 9 alone, namely in the viewing direction from the front in FIG. 7 and in the viewing direction from the back in FIG. 8.

The first oil guide device 9 is formed as an oil collecting plate and positioned at an axial side of the torque converter 4 and, in fact, between the torque converter 4 and the non-visible oil supply system as viewed in an axial direction.

The first oil guide device 9 influences an oil flow in the direction of the torque converter 4, wherein the first oil guide device 9 has at least one first through-hole 10, via which oil can be guided starting from the oil supply system (not shown) in the direction of the torque converter 4, and wherein the first oil guide device 9 has at least one second through-hole 36, via which the first oil guide device 9 can discharge oil from the torque converter 4 and, in fact, in the direction of the oil pan 5.

The transmission housing 2 has a housing wall 11, which encompasses the torque converter 4 radially outwardly partially or in sections. This housing wall 11 has an inner surface 12 with an inner diameter, which is designed such that a gap 13 defined by the inner surface 12 of this housing wall 11 and an outer surface 39 of the torque converter 4 is configured such that oil is conveyed through the gap 13 as a result of a rotary movement of the torque converter 4, which is visualized in FIG. 1 by an arrow 14.

During the rotary movement 14 of the torque converter 4, oil is conveyed from a first area 15 of the motor vehicle transmission 1, namely from a first area 15 of the first transmission chamber 3 of the motor vehicle transmission 1, in the direction of a second area 16 of the first transmission chamber 3 of the motor vehicle transmission 1, wherein this second area 16 is arranged above the first area 15 in the installed position of the motor vehicle transmission 1 in the motor vehicle.

The first area 15 of the first transmission chamber 3 of the transmission housing 2 of the motor vehicle transmission 1 forms a type of oil sump within the first transmission chamber 3.

The at least one second through-hole 36 of the first oil guide device 9 is arranged in the second area 16. Oil can be discharged from the torque converter 4 and, therefore, from the first transmission chamber 3, via the second through-hole 36 of the first oil guide device 9.

The first oil guide device 9, which is formed as an oil collecting plate and is best shown in FIGS. 7 and 8, has a central through-hole 17, through which an input shaft 18 extends in a mounted condition. This central through-hole 17 is used, more particularly, for centering the first oil guide device 9.

At a back side (see FIG. 8) facing away from the torque converter 4, the first oil guide device 9 has ribs 20, which define a flow channel 19 via which oil can be guided in the direction of the oil pan 5, the oil passing from the front side of the first oil guide device 9 in the direction of the back side of the first oil guide device 9 via the at least one through-hole 36.

Further ribs 21 are formed at this back side of the first oil guide device 9, which prevent this oil from spilling over onto an assembly of the transmission, more particularly an intermediate gear, which is positioned in the area of the ribs 21.

Mounting bolts 23 extend through openings 22 in the first oil guide device 9 and are used for mounting the first oil guide device 9, which is formed as an oil collecting plate, at the oil supply system positioned behind the oil guide device 9.

The motor vehicle transmission 1 also has a second oil guide device 24, which is arranged upstream from the housing wall 11 of the transmission housing 2 delimiting the gap 13 radially outwardly relative to an oil flow through the gap 13 caused by the rotary movement 14 of the torque converter 4. This second oil guide device 24 and the first oil guide device 9 are formed as separate assemblies.

The second oil guide device 24 closes an opening 25 in the transmission housing 2, which is formed adjacent to the housing wall 11. Through this opening 25, the first transmission chamber 3 for accommodating the torque converter 4 is connected to the second transmission chamber 6 for accommodating the oil pump, the oil pump motor 7, and the electronic assemblies 8, wherein the second oil guide device 24 closes this opening 25.

The second oil guide device 24 therefore prevents oil, which collects in the first area 15 of the first transmission chamber 3 of the transmission housing 2, from flowing into the second transmission chamber 6 via the opening 25 and, in this way, entering the area of the pump motor 7 and the electronic assemblies 8.

The second oil guide device 24 forms a housing wall in the first area 15 of the motor vehicle transmission 1, the housing wall adjoining the housing wall 11 delimiting the gap 13 radially outwardly and, in fact, upstream from the housing wall 11 relative to the oil flow through the gap 13. The second oil guide device 24 is arranged upstream from the housing wall 11 as viewed in the flow direction of the oil.

While the housing wall 11 of the transmission housing 2 is preferably made of a metal material, the second oil guide device 24 is made of a plastic. The thickness of the housing wall provided by the second oil guide device 24 is thinner than the thickness of the housing wall 11 such that, more particularly, the pump motor 7 can extend, partially or in sections, into the opening 25 to be closed.

Figure 9:
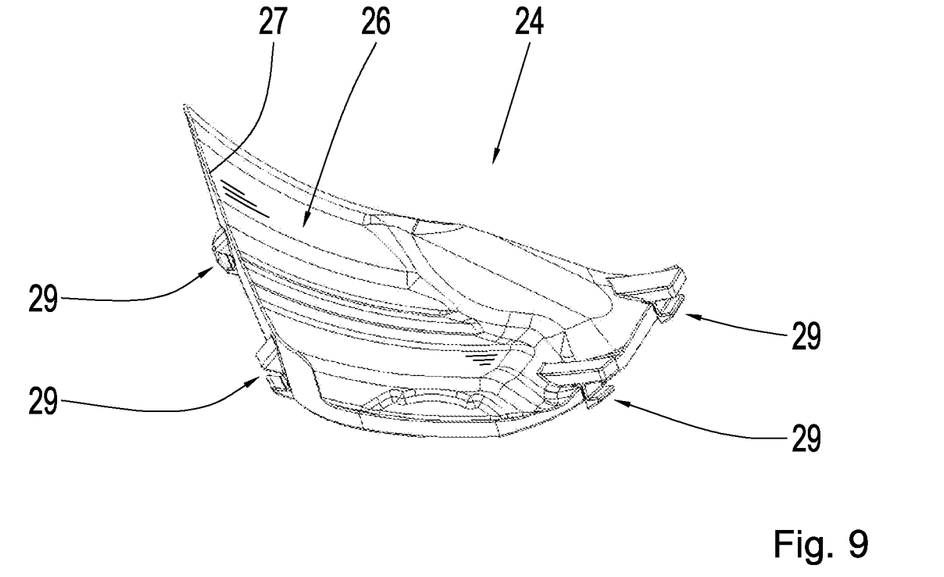
FIG. 9 shows a perspective view of a second oil guide device from above.
Figure 10:
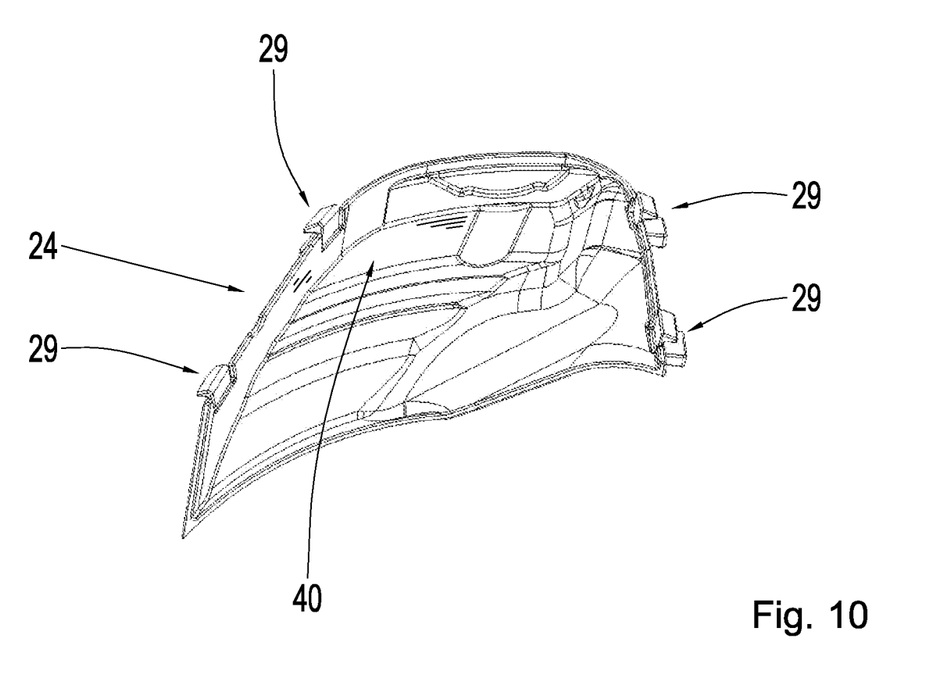
FIG. 10 shows a perspective view of the second oil guide device from below.

FIG. 9 shows a view of the top side 26 of the second oil guide device 24. FIG. 10 shows a view of an underside 40 of the second oil guide device 24. The top side 26 of the second oil guide device 24, together with the outer surface of the torque converter 4, defines a gap 38, which is arranged upstream from the gap 13 defined by the housing wall 11 in the direction of the oil flow caused by the rotation 14 of the torque converter 4. As is shown best in FIGS. 4 and 9, the top side 26 of the second oil guide device 24 is contoured such that an inner diameter of the inner surface of the second oil guide device 24 becomes continuously smaller in an upstream area in the direction of the oil flow caused by the rotary movement 14 of the torque converter 4 as the gap 38 between the second oil guide device 24 and the torque converter 4 becomes smaller. In a downstream area of the second oil guide device 24, the inner diameter at the top side 26 and, therefore, the inner surface of the second oil guide device 24 are approximately constant, wherein the inner diameter at a downstream edge 27 of the second oil guide device 24 is maximally as great as the inner diameter at the adjoining edge 28 of the housing wall 11. The second oil guide device 24 is clipped together with the transmission housing 2 via mounting clips 29, thereby closing the opening 25.

The motor vehicle transmission 1 includes a third oil guide device 30 in addition to the first oil guide device 9 and the second oil guide device 24. The third oil guide device 30 is arranged downstream from the housing wall 11 delimiting the gap 13 radially outwardly relative to the oil flow through the gap 13 caused by the rotary movement 14 of the torque converter 4, and, in fact, in the second area 16 in which the first oil guide device 9 has the at least one second through-hole 36.

Figure 11:
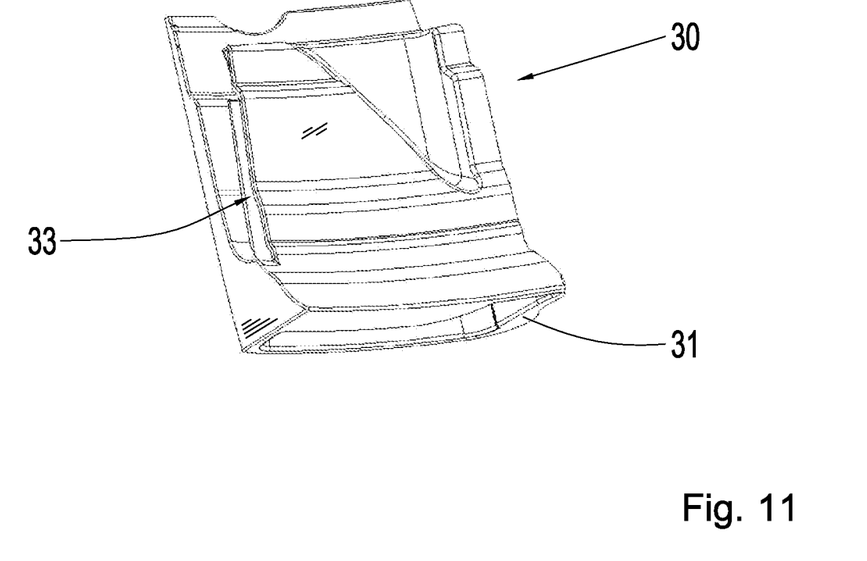
FIG. 11 shows a perspective view of a third oil guide device.

FIG. 11 shows the third oil guide device 30 in a perspective isolated view, wherein a flange 31 of the third oil guide device 30 adjoins a flange 32 of the first oil guide device 9. As viewed from the front, the third oil guide device 30 is therefore positioned axially in front of the first oil guide device 9 and protrudes into a free space between the torque converter 4 and the transmission housing 2.

In the exemplary embodiment shown, the third oil guide device 30 is designed as an assembly that is separate from the first oil guide device 9. It is also possible that the third oil guide device 30 is an integral part of the first oil guide device 9.

The third oil guide device 30 has an opening 33 through which oil can exit the gap 13 and enter the third oil guide device 30 in order to then be guided via the at least one second through-hole 36 of the first oil guide device 9 from the front side of the first oil guide device 9 to the back side of the first oil guide device 9 and discharged in the direction of the oil pan 5 via the channel 19. The third oil guide device 30 can also be referred to as an oil scraper.

Figure 6:
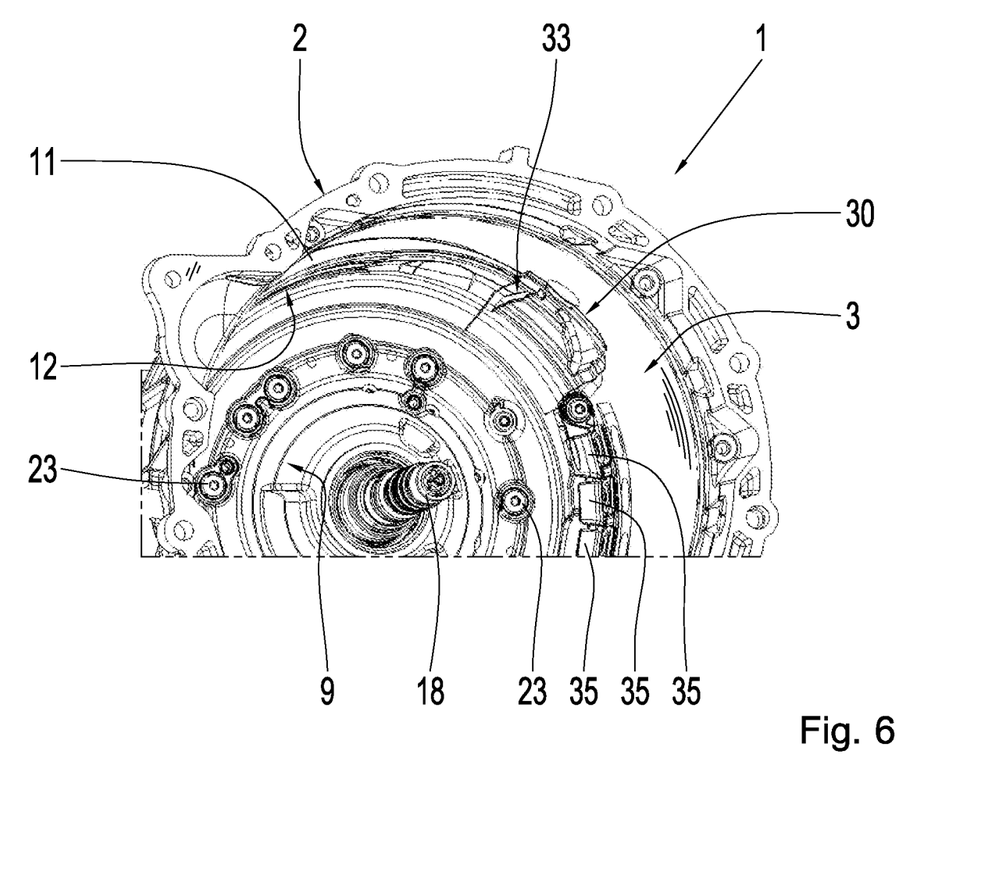
FIG. 6 shows a cutout portion from another perspective view of FIG. 3 obliquely from below.

As is best shown in FIG. 6, the inner diameter of the inner surface 12 of the housing wall 11 becomes larger directly upstream from the third oil guide device 30 such that the gap 13 between the housing wall 11 and the torque converter 4 (not shown in FIG. 6) also becomes larger. As a result, a particularly advantageous pass-over of the oil, which has been conveyed through the gap 13, out of the gap 13 into the third oil guide device 30, namely into the opening 33 in the third oil guide device 30, is enabled. As shown in FIG. 6, the opening 33 is positioned at that side of the third oil guide device that faces the wall 11, i.e., at an edge of the third oil guide device 30 situated upstream relative to the oil flow.

The section of the gap 13, in which the gap 13 enlarges directly upstream from the opening 33 of the third oil guide device 30, can also be provided or delimited radially outwardly by the third oil guide device 30. In this case, the third oil guide device 30 is then extended in the circumferential direction and the housing wall 11 is correspondingly shortened.

Figure 3:
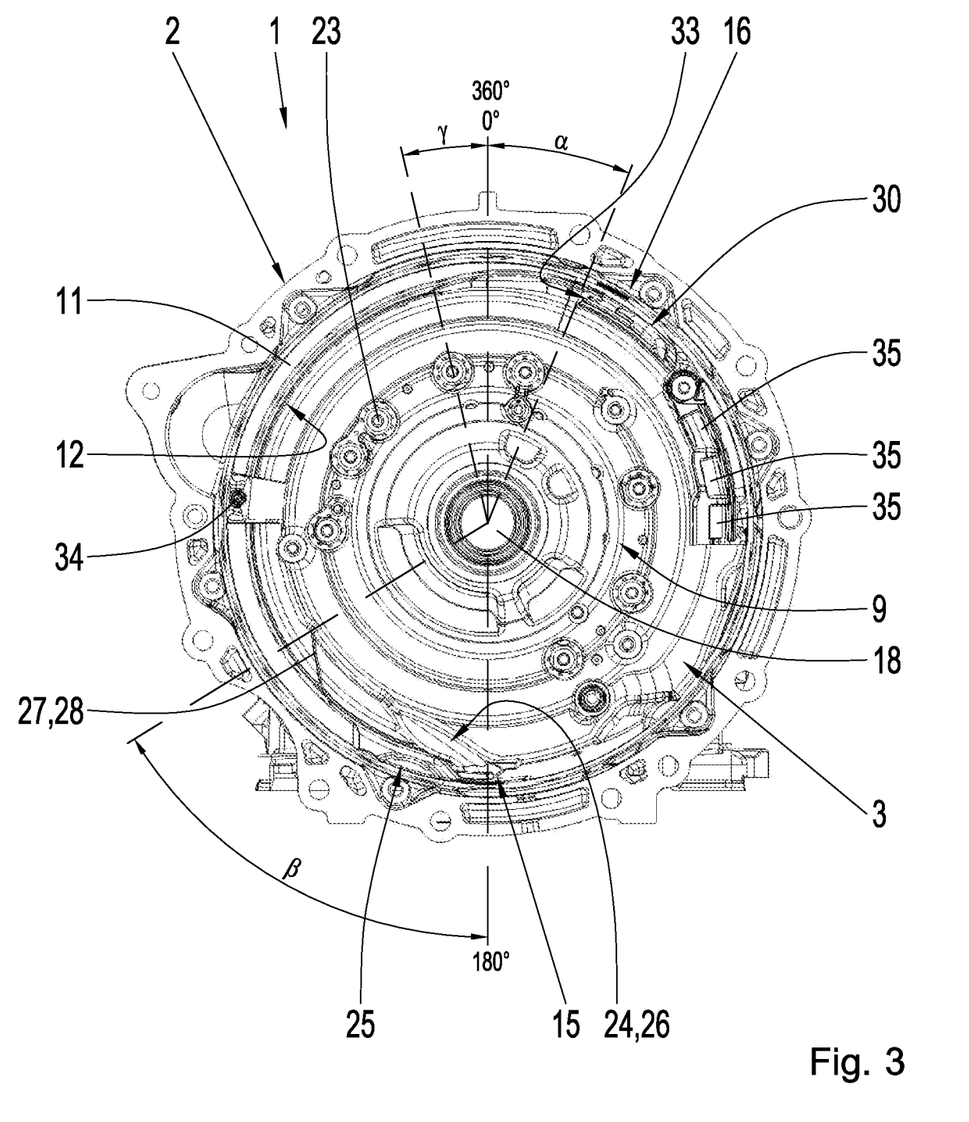
FIG. 3 shows the view from FIG. 1 without a torque converter.

In the installation position of the motor vehicle transmission in the motor vehicle, an enveloping circle extends around the torque converter 4, the enveloping circle having a zero degree (0°) angle position and a three hundred and sixty degree (360°) angle position at the top and a one hundred and eighty (180°) angle position at the bottom, as shown in FIG. 3.

The first area 15 of the motor vehicle transmission 1, namely of the first transmission chamber 3 of the transmission housing 2 of the motor vehicle transmission 1, is arranged around the 180° angle position.

The gap 13 between the inner surface 12 of the housing wall 11 and the outer surface of the torque converter 4 extends at least partially or in sections between the one hundred and eighty (180°) angle position and the three hundred and sixty degree) (360°) angle position.

As mentioned above, the second oil guide device 24 is arranged upstream from the housing wall 11 and the third oil guide device 30 is arranged downstream from the housing wall 11 as viewed in the oil flow direction through the gap 13.

In the preferred exemplary embodiment shown, the housing wall 11 delimiting the gap 13 radially outwardly has the upstream edge 28 and, therefore, the second oil guide device 24 has the downstream edge 27, downstream from the one hundred and eighty) (180°) angle position, wherein these edges 27, 28 enclose a first angular range β with the one hundred and eighty (180°) angle position. This first angular range β is between twenty degrees (20°) and seventy degrees (70°) or between thirty degrees (30°) and sixty degrees (60°) or between forty degrees (40°) and fifty degrees (50°). The edges 27, 28 are slanted with respect to the axial direction (see FIG. 3). Therefore, the angle β changes along the edges 27, 28.

As mentioned above, the third oil guide device 30 is arranged in the second area 16 of the first transmission chamber 3 of the transmission housing 2 of the motor vehicle transmission 1. The upstream edge of the third oil guide device 30, at which the opening 33 is formed, is arranged downstream from the zero degree (0°) angle position or the three hundred and sixty degree (360°) angle position and encloses a second angular range α with the zero degree (0°) angle position and the three hundred and sixty degree) (360°) angle position. The second angular range α is between five degrees (5°) and thirty degrees (30°) or between ten degrees (10°) and twenty degrees (20°).

As has also been mentioned above, the gap 30 between the inner surface 12 of the housing wall 11 and the outer surface 39 of the torque converter 4 expands directly upstream from the opening 33 in the third oil guide device 30, wherein this expansion of the radial gap 13 in the exemplary embodiment shown according to FIG. 3 takes place upstream from the zero degree (0°) angle position and, therefore, upstream from the three hundred and sixty degree (360°) angle position. The beginning of this expansion of the gap 13 encloses a third angular range γ with the three hundred and sixty degree) (360°) angle position and, therefore, the zero degree (0°) angle position, the third angular range γ being between 5° and ten degrees (10°) or between ten degrees (10°) and fifteen degrees (15°).

Figure 4:
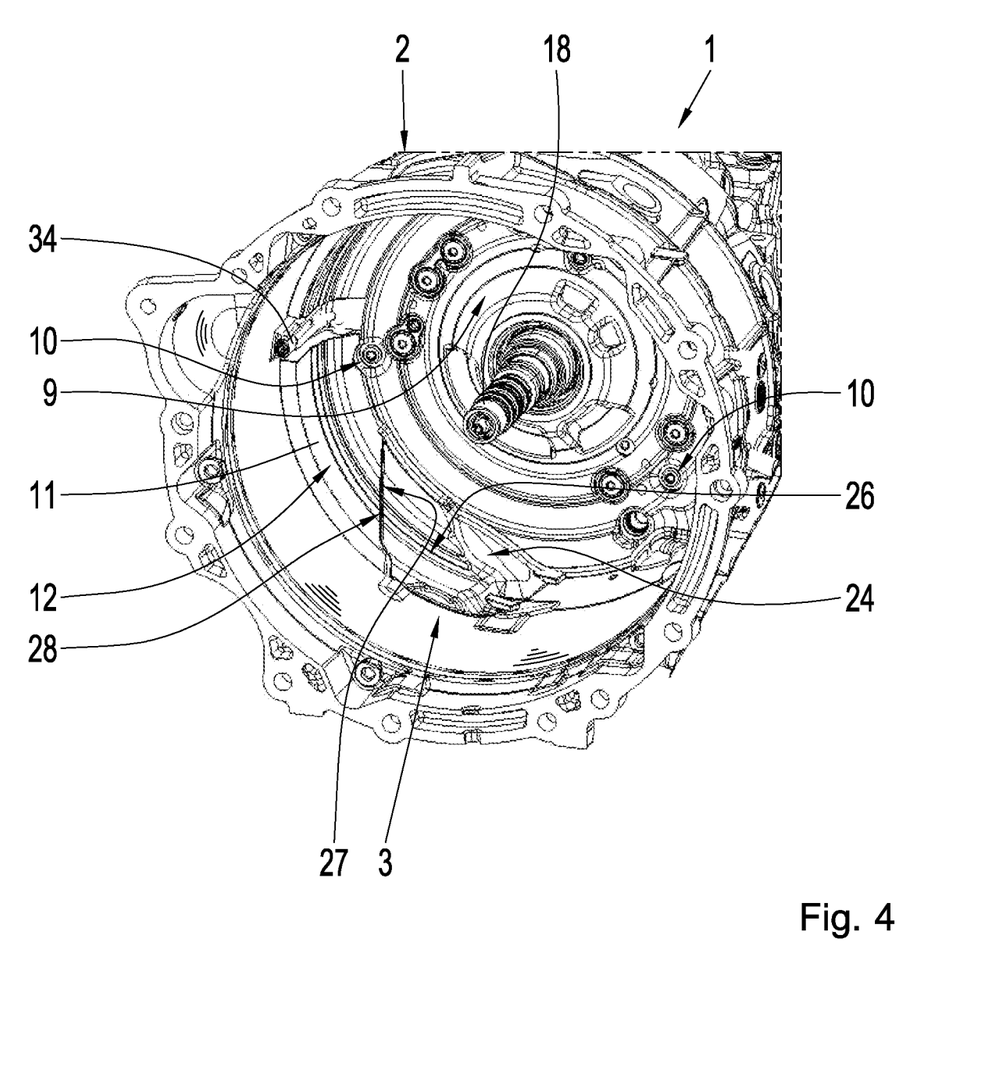
FIG. 4 shows a perspective view of FIG. 3 obliquely from above.
Figure 5:
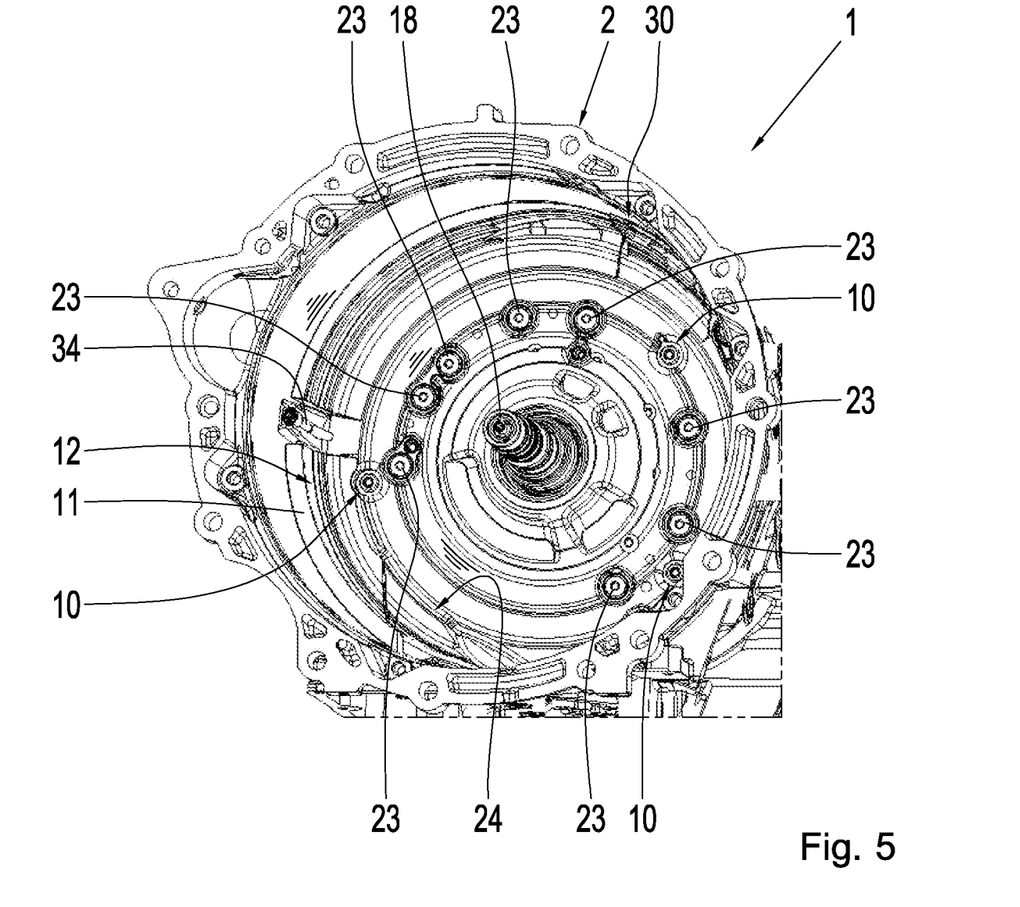
FIG. 5 shows a perspective view of FIG. 3 obliquely from below.

As mentioned above, the first transmission chamber 3 of the transmission housing 2 accommodates not only the torque converter 4, but also an electric machine having a separating clutch. FIGS. 4 and 5 show an oil line 34, which is used for supplying the electric machine and the separating clutch with oil. The wall 11 of the transmission housing 2 is interrupted at that position at which this oil line 34 extends.

The figures also show high voltage terminals 35 for the electrical contacting of the electric machine.

With the aid of example aspects of the invention, a particularly installation space-saving structural embodiment of a motor vehicle transmission 1 can be provided.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 motor vehicle transmission
2 transmission housing
3 first housing chamber
4 torque converter
5 oil pan
6 second housing chamber
7 pump motor
8 electronic assembly
9 first oil guide device
10 through-hole
11 housing wall
12 inner surface
13 gap
14 direction of rotation
15 first area
16 second area
17 through-hole
18 input shaft
19 flow channel
20 rib
21 rib
22 opening
23 mounting bolt
24 second oil guide device
25 opening
26 top side
27 edge
28 edge
29 mounting clip
30 third oil guide device
31 flange
32 flange
33 opening
34 oil line
35 high voltage terminals
36 through-hole
37 underside
38 gap
39 outer surface
40 underside

The invention claimed is:

1. A motor vehicle transmission (1), comprising:
a transmission housing (2), the transmission housing (2) having a housing wall (11) comprising an inner surface (17);
a torque converter (4) accommodated in the transmission housing (2), the housing wall (11) of the transmission housing (2) enclosing the torque converter (4) radially outwardly at least in sections, an inner diameter of the inner surface (17) of the housing wall (11) being configured such that a gap (13) defined by the inner surface (17) of the housing wall (11) and an outer surface (39) of the torque converter (4) in a radial direction is configured to convey oil from a first area (15) of the motor vehicle transmission (1) into a second area (16) of the motor vehicle transmission (1) during rotary movement of the torque converter (4), the second area (16) of the motor vehicle transmission (1) being arranged above the first area (15) in an installed position of the motor vehicle transmission (1); and a first oil guide device (9), the first oil guide device (9) being positioned exclusively outside of the gap (13) and at an axial side of the torque converter (4), the first oil guide device (9) being configured to influence an oil flow in a direction of the torque converter (4).

2. The motor vehicle transmission of claim 1, wherein the first oil guide device (9) is formed as an oil collecting plate.

3. The motor vehicle transmission of claim 1, wherein:
the first oil guide device (9) comprises at least one first through-hole (10) via which the first oil guide device (9) guides oil in the direction of the torque converter (4); and
the first oil guide device (9) comprises at least one second through-hole (36) in the second area (16) of the motor vehicle transmission (1) via which the first oil guide device (9) guides oil away from the torque converter (4), the oil being conveyable during the rotary movement of the torque converter (4) via the gap (13) defined by the inner surface of the housing wall (11) and the outer surface of the torque converter (4).

4. The motor vehicle transmission of claim 1, further comprising a second oil guide device (24) arranged upstream from the housing wall (11) relative to an oil flow through the gap (13) caused by the rotary movement of the torque converter (4).

5. The motor vehicle transmission of claim 4, wherein the second oil guide device (24) and the first oil guide device (9) are formed of discrete pieces of material.

6. The motor vehicle transmission of claim 4, wherein:
the second oil guide device (24) closes an opening (25) in the transmission housing (2) and separates a first housing chamber (3) accommodating the torque converter (4) from a second housing chamber (6) accommodating an oil pump and a pump motor (7) and electronic components (8); and
wherein the second housing chamber (6) is arranged below the first housing chamber (3) in the installed position of the motor vehicle transmission (1).

7. The motor vehicle transmission of claim 4, wherein the second oil guide device (24) forms a housing wall in the first area (15) of the motor vehicle transmission (1).

8. The motor vehicle transmission of claim 4, wherein the second oil guide device (24) comprises an inner surface with an inner diameter, the inner diameter of the inner surface of the second oil guide device (24) decreasing at least in sections as viewed in a direction of the oil flow caused by the rotary movement of the torque converter (4) as a gap (38) between the second oil guide device (24) and the torque converter (4) decreases.

9. The motor vehicle transmission of claim 8, wherein the inner diameter of the second oil guide device (24) adjacent to the inner diameter of the housing wall (11) is maximally as great as or less than the inner diameter of the housing wall (11).

10. The motor vehicle transmission of claim 1, further comprising a third oil guide device (30) arranged downstream from the housing wall (11) relative to the oil flow through the gap (13) caused by the rotary movement of the torque converter (4).

11. The motor vehicle transmission of claim 10, wherein the third oil guide device (30) and the first oil guide device (9) are formed of discrete pieces of material.

12. The motor vehicle transmission of claim 10, wherein the third oil guide device (30) is integrally formed with the first oil guide device (9).

13. The motor vehicle transmission of claim 10, wherein the third oil guide device (30) is arranged in the second area (16) of the motor vehicle transmission.

14. The motor vehicle transmission of claim 10, wherein the gap (13) increases upstream from the third oil guide device (24) relative to the oil flow through the gap (13) caused by the rotary movement of the torque converter (4).

15. The motor vehicle transmission of claim 1, further comprising:
a second oil guide device (24) arranged upstream from the housing wall (11) relative to an oil flow through the gap (13) caused by the rotary movement of the torque converter (4); and
a third oil guide device (30) arranged downstream from the housing wall (11) relative to the oil flow through the gap (13) caused by the rotary movement of the torque converter (4),
wherein an enveloping circle extending around the torque converter (4) in the installed position of the motor vehicle transmission (1) has a 0° angle position at a top of the enveloping circle and a 180° angle position at a bottom of the enveloping circle,
wherein the housing wall (11) comprises an upstream edge from the 180° angle position, the upstream edge of the housing wall (11) enclosing a first angular range between 20° and 70° from the 180° angle position, the second oil guide device (24) covering at least the first angular range, and
wherein the third oil guide device (30) comprises an upstream edge from the 0° angle position, the upstream edge of the third oil guide device (30) enclosing a second angular range between 5° and 30° with the 0° angle position.

16. A motor vehicle transmission (1), comprising:
a transmission housing (2), the transmission housing (2) having a housing wall (11) comprising an inner surface (17);
a torque converter (4) accommodated in the transmission housing (2), the housing wall (11) of the transmission housing (2) enclosing the torque converter (4) radially outwardly at least in sections, an inner diameter of the inner surface (17) of the housing wall (11) being configured such that a gap (13) defined by the inner surface (17) of the housing wall (11) and an outer surface (39) of the torque converter (4) is configured to convey oil from a first area (15) of the motor vehicle transmission (1) into a second area (16) of the motor vehicle transmission (1) during rotary movement of the torque converter (4), with the second area (16) of the motor vehicle transmission (1) being arranged above the first area (15) in an installed position of the motor vehicle transmission (1);
a first oil guide device (9) positioned at an axial side of the torque converter (4) and configured to influence an oil flow in a direction of the torque converter (4); and
a second oil guide device (24) arranged upstream from the housing wall (11) relative to an oil flow through the gap (13) caused by the rotary movement of the torque converter (4), the second oil guide device (24) comprising an inner surface with an inner diameter, the inner diameter of the inner surface of the second oil guide device (24) decreasing at least in sections as viewed in a direction of the oil flow caused by the rotary movement of the torque converter (4) as a gap (38) between the second oil guide device (24) and the torque converter (4) decreases.

17. A motor vehicle transmission (1), comprising:

a transmission housing (2), the transmission housing (2) having a housing wall (11) comprising an inner surface (17);

a torque converter (4) accommodated in the transmission housing (2), the housing wall (11) of the transmission housing (2) enclosing the torque converter (4) radially outwardly at least in sections, an inner diameter of the inner surface (17) of the housing wall (11) being configured such that a gap (13) defined by the inner surface (17) of the housing wall (11) and an outer surface (39) of the torque converter (4) is configured to convey oil from a first area (15) of the motor vehicle transmission (1) into a second area (16) of the motor vehicle transmission (1) during rotary movement of the torque converter (4), with the second area (16) of the motor vehicle transmission (1) being arranged above the first area (15) in an installed position of the motor vehicle transmission (1);

a first oil guide device (9) positioned at an axial side of the torque converter (4) and configured to influence an oil flow in a direction of the torque converter (4); and a third oil guide device (30) arranged downstream from the housing wall (11) relative to the oil flow through the gap (13) caused by the rotary movement of the torque converter (4), the gap (13) increasing upstream from the third oil guide device (24) relative to the oil flow through the gap (13) caused by the rotary movement of the torque converter (4).

* * * * *